United States Patent [19]

Kawai

[11] Patent Number: 4,478,190
[45] Date of Patent: Oct. 23, 1984

[54] FUEL INJECTION TIMING CONTROL IN ELECTRONICALLY CONTROLLED ENGINE

[75] Inventor: Taiyo Kawai, Susono, Japan

[73] Assignee: Toyota Jidosha Kabushki Kaisha, Toyota, Japan

[21] Appl. No.: 444,366

[22] Filed: Nov. 26, 1982

[30] Foreign Application Priority Data

Jul. 14, 1982 [JP] Japan .............................. 57-121182

[51] Int. Cl.³ .................... F02D 5/00; F02D 5/02; F02B 3/00
[52] U.S. Cl. .................................. 123/478; 123/486; 123/306; 123/480
[58] Field of Search ............... 123/478, 480, 486, 306, 123/188

[56] References Cited

U.S. PATENT DOCUMENTS

| | | | |
|---|---|---|---|
| 4,250,858 | 2/1981 | Jeenicke et al. | 123/480 |
| 4,269,156 | 5/1981 | Drellishak | 123/478 |
| 4,327,691 | 5/1982 | Moser | 123/478 |
| 4,359,991 | 11/1982 | Stumpp et al. | 123/478 |
| 4,372,278 | 2/1983 | Smith | 123/478 |
| 4,379,332 | 4/1983 | Busser et al. | 123/480 |
| 4,383,514 | 5/1983 | Fiala | 123/478 |
| 4,387,429 | 6/1983 | Yamauchi et al. | 123/478 |
| 4,391,253 | 7/1983 | Ito | 123/478 |

Primary Examiner—Raymond A. Nelli
Attorney, Agent, or Firm—Cushman, Darby & Cushman

[57] ABSTRACT

A basic injection timing (InjO) is set, and an intermediate time ($\Delta$Inj) is set based on rotational speed of an engine and fuel injection pulse time in a fuel injector. A fuel injection starting timing ($\theta$) is set according to the sum or difference of the basic injection timing and the intermediate time. As a result, mixture is introduced into a vortex controlled combustion chamber so that a rich mixture is distributed to the upper portion of the combustion chamber near the ignition plug to provide satisfactory stratified combustion.

11 Claims, 9 Drawing Figures

F I G. 2
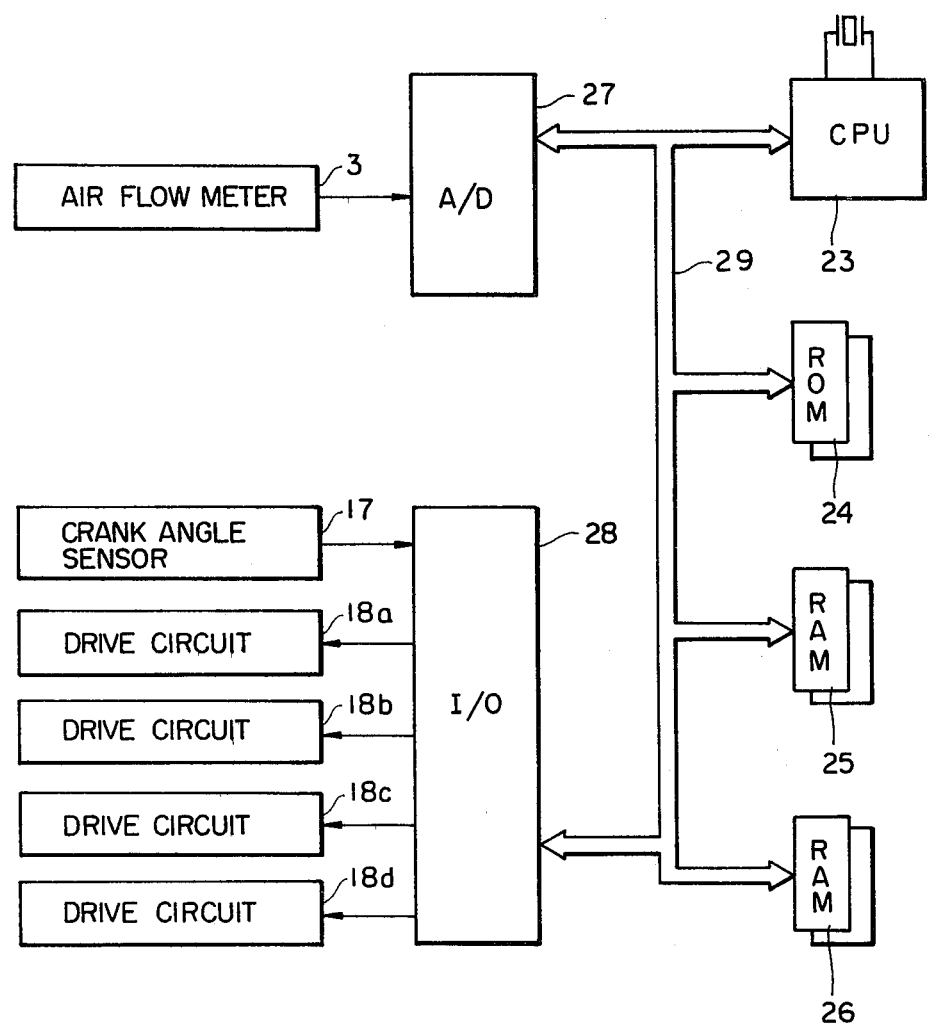

FIG. 6

| τi \ N | 1000 | 1500 | 2000 | 2500 | 3000 | 3500 | 4000 | --- |
|---|---|---|---|---|---|---|---|---|
| 3 | 10 | 15 | 20 | 23 | 26 | 28 | 30 | |
| 4 | 20 | 26 | 32 | 36 | 40 | 43 | 46 | |
| 5 | 30 | 37 | 43 | 47 | 51 | 54 | 57 | |
| 6 | 40 | 48 | 55 | 60 | 64 | 68 | 72 | |
| ---- | | | | | | | | |

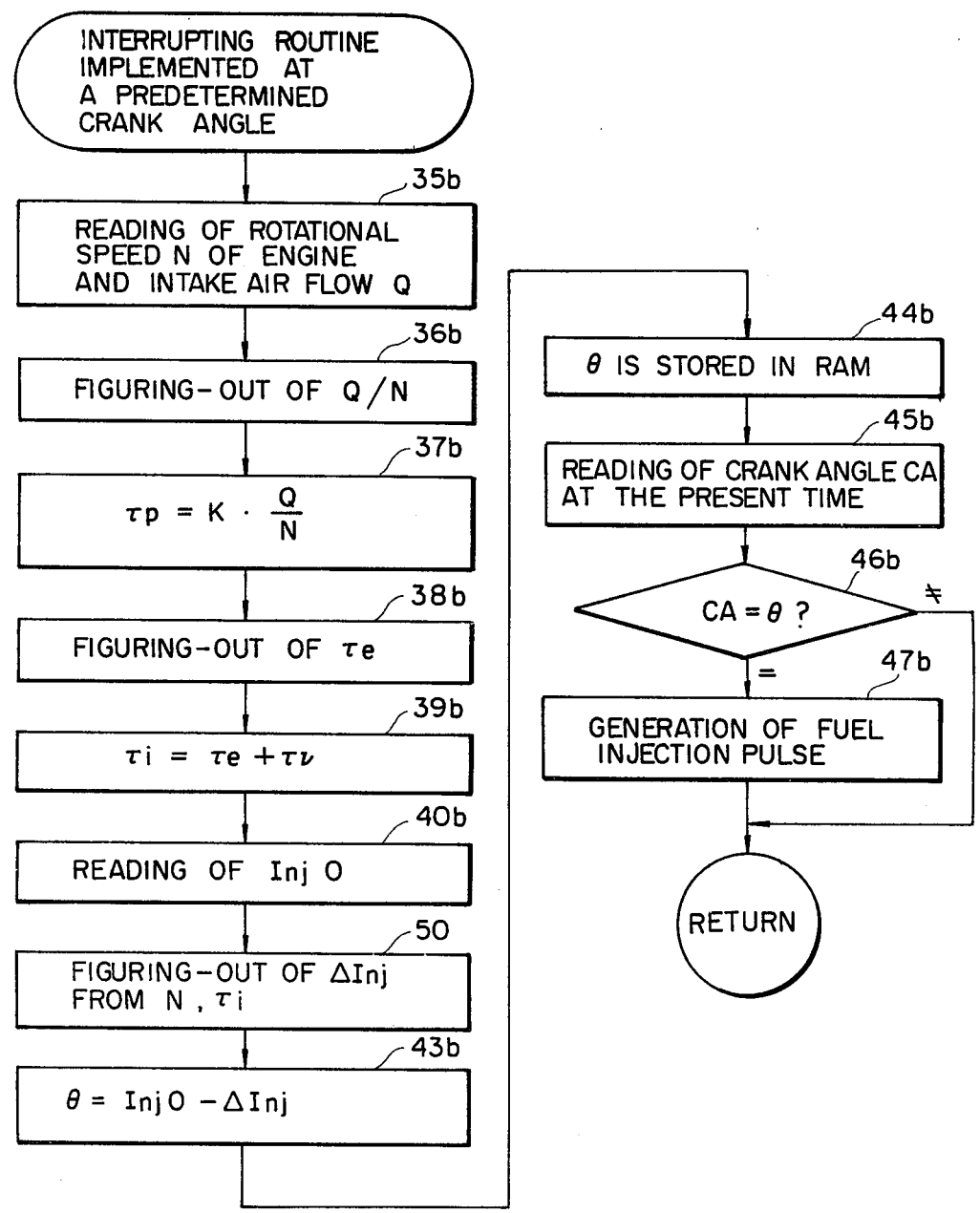

4,478,190

FUEL INJECTION TIMING CONTROL IN ELECTRONICALLY CONTROLLED ENGINE

BACKGROUND OF THE INVENTION

1. Field of the Invention

This invention relates to an apparatus for controlling fuel injection starting timing in an electronically controlled engine.

2. Description of the Prior Art

In Japanese patent application No. 52270/80 (Japanese Patent Laid-open No. 148636/81) this applicant described an electronically controlled engine in which mixture in a combustion chamber is stratified to form vortex control in the combustion chamber while distributing rich fuel mixture to the upper portion of the combustion chamber, i.e., near the ignition plug, in firing for stabilizing combustion and improving efficiency of fuel consumption and purification of exhaust gas while keeping the mixture lean as a whole. This prior application disclosed that fuel injection stopping timing is figured out as a function of rotational speed N of an engine, and fuel injection starting timing $\theta$ is defined according to the calculated fuel injection finishing timing $\tau_{end}$ and the ratio of intake air flow Q to N, i.e., Q/N. However, in such a system for establishing N, the fuel injection starting timing so established did not satisfactorily provide stratification of the mixture.

SUMMARY OF THE INVENTION

The present invention provides an apparatus for controlling a fuel injection starting timing in an electronically controlled engine to achieve satisfactory stratification of the fuel mixture.

According to the present inventions an apparatus for controlling fuel injection starting timing in an electronically controlled engine in which intake air is introduced into a combustion chamber to establish vortex control in the combustion chamber is utilized. Fuel is injected to an intake path from a fuel injector operated by electric signals, a basic injection timing (InjO) is set and an intermediate time ($\Delta$Inj), previously set as a function f(N, $\tau$i) of rotational speed N of the engine and fuel injection pulse time $\tau$i in the fuel injector is calculated to define a fuel injection starting subtracting from InjO intermediate time $\Delta$Inj. As a result, rich mixture is introduced into the combustion chamber to be accurately distributed near a cylinder head, close to its associated spark plug.

The intermediate time $\Delta$Inj used for calculating the fuel injection starting timing $\theta$ may be a sum of a first function value $\Delta$Inj 1, set as a function of the rotational speed N of the engine, and a second function value $\Delta$Inj 2, set as a function of the fuel injection pulse time.

Also, the intermediate time $\Delta$Inj may be calculated on the basis of a two dimensional map showing the rotational speed N of the engine and fuel injection pulse time $\tau$i in coordinates.

The basic fuel injection timing InjO is set according to types of engines and vehicles so that fuel injected from the fuel injector is introduced into the combustion chamber during the later half of the intake stroke.

Preferably, the formed engine vortex in the combustion chamber is constructed to form a helical intake port and introduce such intake air into the combustion chamber.

BRIEF DESCRIPTION OF THE INVENTION

FIG. 2 is a block diagram of the electronic control apparatus.

FIG. 6 is a drawing showing data on a two-dimensional map having the rotational speed of engine and fuel injection pulse time as coordinates.

FIG. 9 is a flow chart of a program of a second embodiment according to the present invention.

DETAILED DESCRIPTION OF PREFERRED EMBODIMENTS

Figure 1:
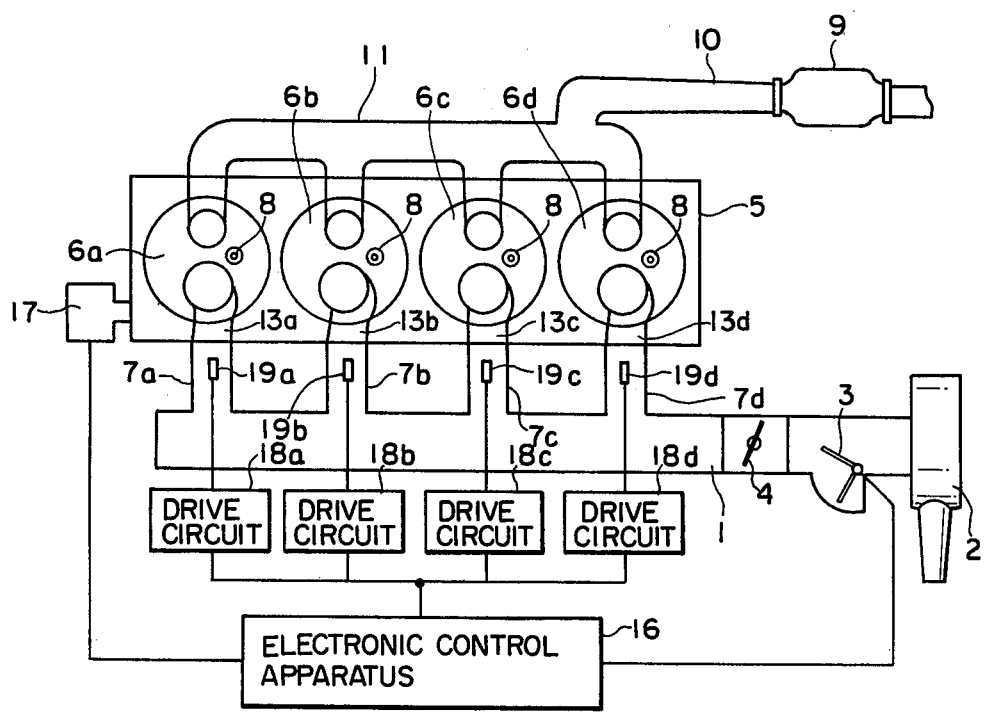
FIG. 1 is a schematic view of an electronically controlled engine according to the present invention.

In an intake path 1 are provided, order upstream from an air cleaner 2, an air flow meter 3 for detecting intake air flow Q and a throttle valve 4 for controlling the sectional area of flow in the intake path 1 connected to an accelerator pedal. An engine body 5 has four combustion chambers 6a~6d having ignition plugs 8, respectively and is connected to intake pipes 7a~7d at the intake system side, and to an exhaust manifold 11 at the exhaust system side. A catalyst converter 9 is provided in an exhaust pipe 10. Intake ports 13a~13d to form vortex in the combustion chambers 6a~6d are provided in the form of helical ports (or deviated type ports) for deviating and introducing intake air to the combustion chamber. Such helical port or deviated type port are well known. An electronic control apparatus 16 receives input signals from the air flow meter 3 and a crank angle sensor 17 to send output signals to drive circuits 18a~18d. The crank angle sensor 17 sends a first type of signal generating pulses at every 30° change of crank angle and a second type of signal generating pulses at every 720° change of the crank angle. The second type of signal is utilized for detecting the reference crank angle of a reference cylinder. Fuel injectors 19a~19d are provided near their respective intake ports 13a~13d to be driven individually by the drive circuits 18a~18d.

FIG. 2 is a block diagram of the electronic control apparatus 16. CPU 23, ROM 24, RAMs 25 and 26, A/D (analog/digital converter) 27 and I/O (input/output interface) 28 are connected to each other through a bus 29. RAM 26 is supplied with power from a back-up power source (not shown) even while an engine switch is turned off. The analog output of the air flow meter 3 is sent to A/D 27 and the digital output of the crank angle sensor 17 is sent to I/O 28. The drive circuits 18a~18d receive pulse signals from I/O 28.

Figure 3:
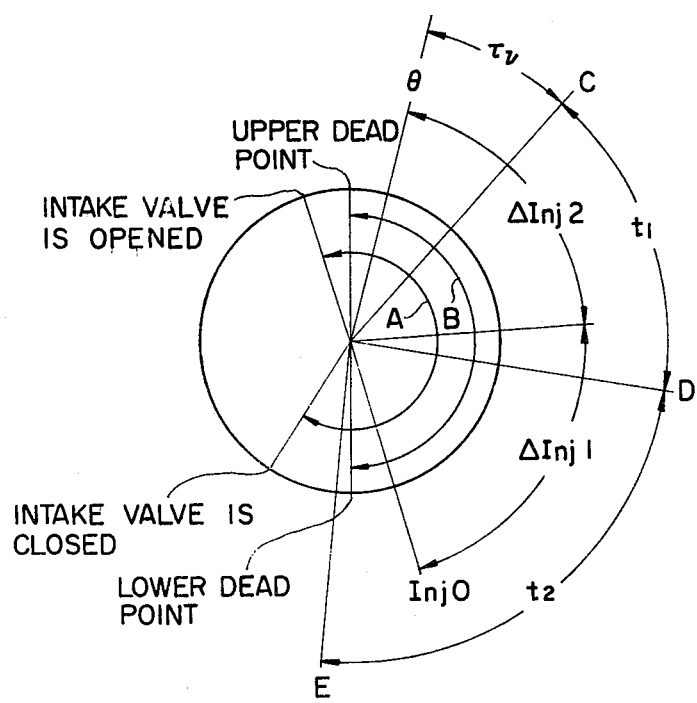
FIG. 3 is an explanatory drawing for describing the basic concept of the present invention.
Figure 4:
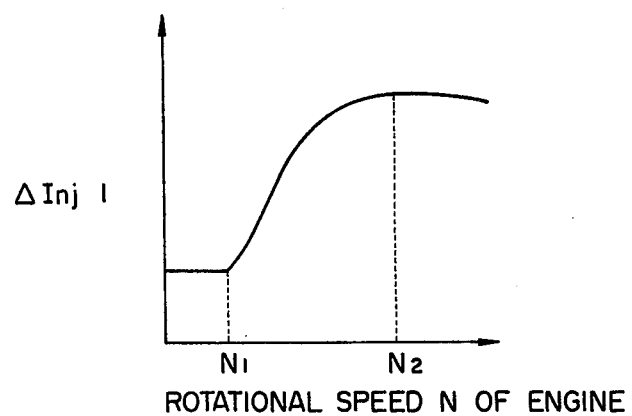
FIG. 4 is a graph showing the relationship between rotational speed of engine and its function value.
Figure 5:
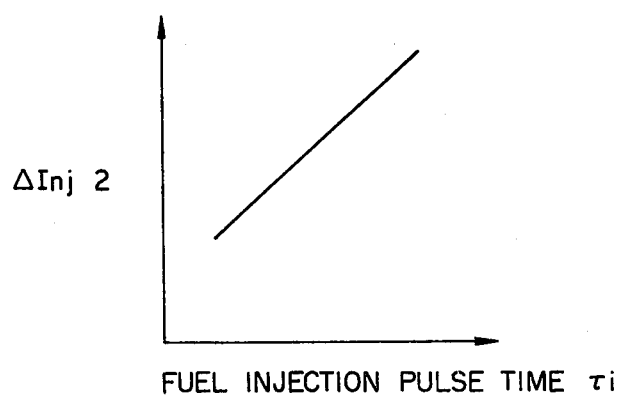
FIG. 5 is a graph showing the relationship between fuel injection pulse time and its function value.

FIG. 3 describes the basic concept of the present invention, in which A shows a period when an intake valve in the combustion chamber is opened and B the intake stroke respectively. The basic injection timing InjO may be set for a crank angle near the lower dead point of the intake stroke. The fuel injection starting timing $\theta$ may be set by subtracting intermediate time $\Delta$Inj (=$\Delta$Inj 1+$\Delta$Inj 2) from Inj0. $\Delta$Inj 1 is defined as shown in FIG. 4. In FIG. 4, the abscissa represents the rotational speed N of engine and the ordinate ΔInj 1. Further, N is detected through the input pulse from the crank angle sensor 17. ΔInj 1 is a constant when N≦N1, an increasing function of N when N1≦N≦N2 and a constant or decreasing function of N when N≦N2. ΔInj 2 is defined as shown in FIG. 5. In FIG. 5, the abscissa represents the fuel injection pulse time τi and the ordinate ΔInj 2. ΔInj 2 is a primary increasing function of τi. τi is a function of intake air flow Q. Intermediate time ΔInj can be directly calculated from a map showing the rotational speed N of engine and fuel injection time τi represented by the coordinates. Such a map is shown in FIG. 6 in which the units of N, τi and intermediate time ΔInj are respectively r.p.m., msec and crank angle. If corresponding data are not defined on the map, the intermediate time ΔInj is calculated by interpolation. Fuel injection from the respective fuel injector 19a~19d is carried out once every two revolutions of the engine. The fuel injection pulse time τi is approximately a proportional function of Q/N, and since fuel injection from the respective fuel injectors 19a~19d is carried out N/2 times per unit time, fuel injection amount per the unit time is approximately proportional to Q. Again with respect to FIG. 3, the fuel injectors 19a~19d receive fuel injection pulses since the fuel injection starting timing θ only for the fuel injection pulse time τi is represented by the following formula:

$$\tau i = \tau v + \tau e$$

where τv represents ineffective injection time which is constant irrespective of running conditions of an engine and τe effective injection time. Hence, the fuel injectors 19a~19d are opened at crank angle C when time τv elapses after θ so that the point of fuel injection continues for τe after the crank angle C. Since there exists a predetermined distance between the fuel injection position and combustion chamber, fuel enters the combustion chambers 6a~6d at crank angle D spaced by crank angle t1 from crank angle C, i.e., during the later half of the intake stroke. All fuel enters the combustion chambers 6a~6d immediately before the intake valve is closed. The basic injection timing Inj0 is set according to the types of engines and vehicles so that fuel enters the combustion chambers 6a~6d during the later half of the intake stroke under all running conditions of the engine. As a result, leaner mixture is distributed to the lower portion of the combustion chambers 6a~6d, i.e., near the piston, and richer mixture is distributed to the upper position of the combustion chambers 6a~6d, i.e., near the cylinder head, to flow together with vortex into the combustion chambers 6a~6d. The vortex prevents the mixture from dispersing in the axial direction of the combustion chambers 6a~6d and the stratified condition of the mixture is maintained until the piston reaches near the upper dead point of the compression stroke. Consequently, since rich mixture is distributed near the discharging gap of an ignition plug, stable combustion is obtained even with lean mixture as a whole. Such combustion improves the efficiency of fuel consumption while reducing noxious components in exhaust gas. Further, ΔInj 2 may be a function of τe, and τe may be used for the map shown in FIG. 6 in place of τi. τe is a function of τi as is understood from the above-mentioned formula.

Figure 7:
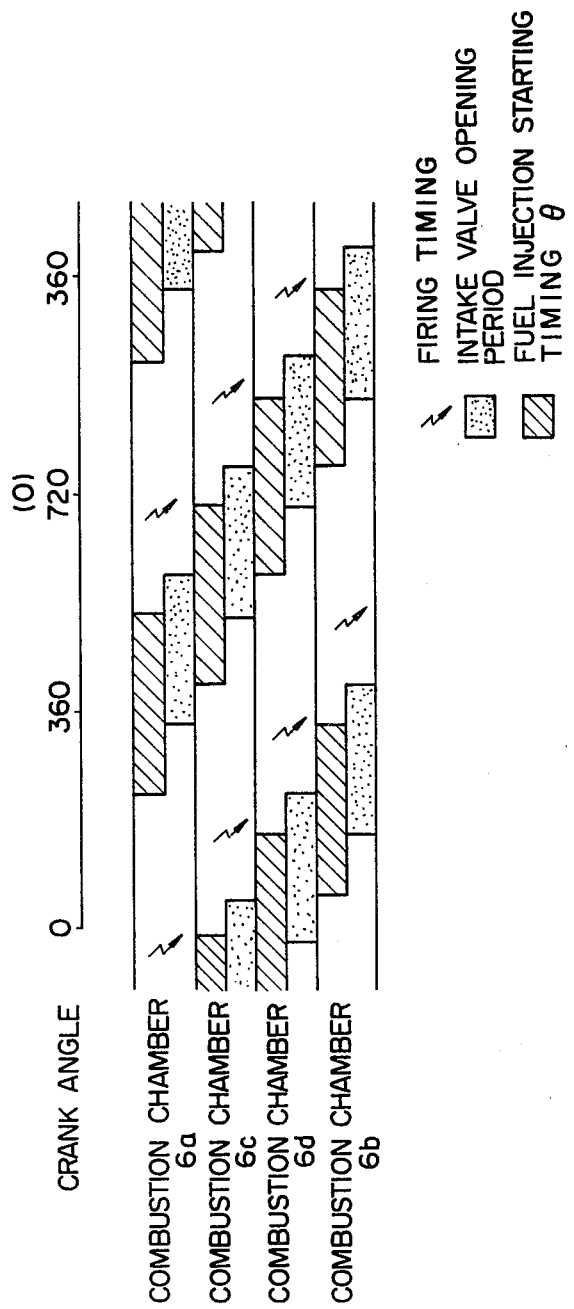
FIG. 7 is a drawing showing fuel injection starting timing in each combustion chamber.

FIG. 7 is a time chart showing the fuel injection starting timing of the respective combustion chambers 6a~6d. The abscissa represents crank angle, and ignition order is 6a, 6c, 6d and 6b. As shown in the drawing, the range of the fuel injection starting timing θ covers before and after the upper dead point of the intake stroke, i.e., from the later half of the exhaust stroke to the first half of the intake stroke.

Figure 8:
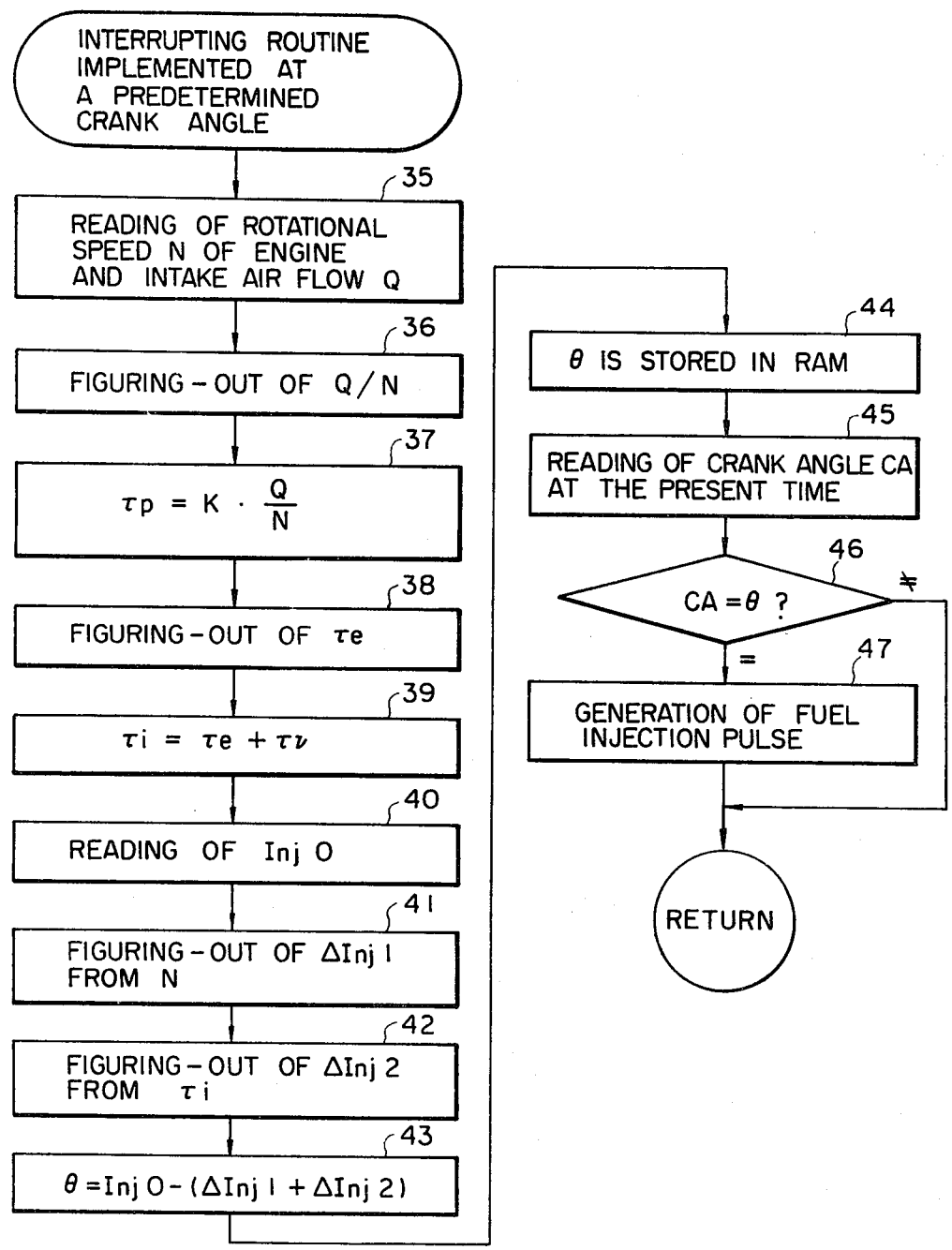
FIG. 8 is a flow chart of a program of a first embodiment according to the present invention.

FIG. 8 is a flow chart showing a program of a first embodiment according to the present invention, i.e., an interrupting routine implemented when a predetermined crank angle is reached. On step 35 are read the rotational speed N of engine and intake air flow Q. On step 36 is figured out Q/N. On step 37 is figured out the basic injection pulse time τp from τp=K Q/N, where K is a constant. On step 38 is figured out effective injection pulse time τe by correcting τp with temperatures of engine colling water, intake air, etc. On step 39 is substituted τe+τv for τi. On step 40 is read the basic injection period Inj0. On step 41 is figured out ΔInj 1 from N. On step 42 is figured out ΔInj 2 from τi. On step 43 is figured out the fuel injection starting timing θ from θ=Inj0−(ΔInj 1+ΔInj 2). On step 44 is stored θ in RAM 25. On step 45 is read crank angle CA at the present time. On step 46 is judged whether or not CA=θ. When CA=θ, fuel injection pulse is generated on step 47 and when CA≠θ, the program returns to the first step. Thus, fuel injection is started from θ.

FIG. 9 is a flow chart showing a program of a second embodiment according to the present invention. Steps implementing the same processes as those in FIG. 8 are shown with the letter b attached to the steps of FIG. 8, the description of these steps is not repeated. Steps 41, 42 in FIG. 8 are omitted and, instead, step 50 is implemented. On step 50 is figured out ΔInj directly from τi and N according to the map in FIG. 6.

Thus, according to the present invention, a proper fuel injection timing is provided so that fuel positively enters the combustion chamber to distribute rich mixture near the cylinder head (i.e., ignition plug) in the combustion chamber for stabilizing the combustion.

What is claimed is:
1. An apparatus for controlling a fuel injection starting timing for an electronically controlled engine, comprising:
   a plurality of vortex controlled air intake combustion chambers;
   means for injecting fuel into an intake path from a fuel injector controlled by a basic injection timing;
   means for calculating an intermediate timing signal as a function of rotational speed of the engine and fuel injection pulse time in the fuel injector; and
   means for combining the intermediate timing signal with said basic injection timing to establish the fuel injection starting timing individually for each of said combustion chambers.
2. An apparatus as defined in claim 1, wherein:
   said intermediate timing signal is a sum of a first function value established as a function of the rotational speed of said engine and a second function value established as a function of said fuel injection pulse time.
3. An apparatus as defined in claim 2, wherein:
   said fuel injection pulse time is a function of intake air flow.
4. An apparatus as defined in claim 3, wherein:
   said basic injection timing is established so that fuel injected from the fuel injector is introduced into said combustion chambers during the later half of their respective intake strokes.

5. An apparatus defined in claim 4, wherein:
an intake port is helically formed in said combustion chambers for introducing intake air with vortex control into said combustion chambers.

6. An apparatus as defined in claim 1, wherein:
said intermediate time is derived from a two dimensional map having coordinates representing rotational speed of the engine and the fuel injection pulse time.

7. An apparatus as defined in claim 6, wherein:
said fuel injection pulse time is a function of intake air flow.

8. An apparatus as defined in claim 7, wherein:
said basic injection timing is established so that fuel injected from the fuel injector is introduced into said combustion chambers during the later half of their respective intake strokes.

9. An apparatus as defined in claim 8, wherein:
an intake port is helically formed in said combustion chambers for introducing intake air with vortex control into said combustion chambers.

10. An apparatus for controlling fuel injection in an electronically controlled internal combustion engine, comprising:
an internal combustion engine with a plurality of vortex controlled combustion chambers;
individually controlled ignition plugs and fuel injectors for each of said combustion chambers;
injection timing means for controlling said fuel injectors with a basic timing signal, said basic timing signal solely dependent on the output of a crank angle sensing means, and said basic timing signal being positive only within the last half of an intake stroke for the combustion chamber associated with the controlled fuel injector;
timing modifying means for establishing a modifying signal as a function of engine speed and a determined fuel injection pulse width; and
means for modifying the control of said injection timing means in response to the established modifying signal; wherein
said fuel injectors are individually controlled to begin injecting fuel to their respective combustion chambers in accordance with the modifying and basic timing signals for a duration established by said fuel injection pulse width; and wherein
said vortex control causes a relatively rich fuel mixture to be injected near the ignition plug located within each of said combustion chambers.

11. A method of controlling fuel injection in an electronically controlled internal combustion engine, comprising the steps of:
providing an engine with a plurality of vortex controlled combustion chambers;
providing an ignition plug and respective individual control means therefore for each of said combustion chambers;
controlling each of said plugs with a basic injection timing which establishes injection during the last half of the intake stroke for the combustion chamber associated with each controlled plug, said basic injection timing determined solely from crank angle;
calculating on intermediate injection timing signal as a function of engine speed N and fuel injection timing $\tau i$;
determining a fuel injection starting timing $\theta$ for each of said ignition plugs by subtracting the calculated intermediate injection timing signal from the basic injection timing; and
injecting fuel into each combustion chamber and controlling its respective ignition plug for a fuel injection time $\tau i$ beginning with the determined fuel injection starting timing $\theta$; wherein
said injected fuel is relatively rich within said combustion chambers at an area nearest its respective ignition plug.

* * * * *